United States Patent [19]

Stackhouse

[11] 4,068,536

[45] Jan. 17, 1978

[54] MANIPULATOR

[75] Inventor: Theodore Hahn Stackhouse, Cincinnati, Ohio

[73] Assignee: Cincinnati Milacron Inc., Cincinnati, Ohio

[21] Appl. No.: 753,725

[22] Filed: Dec. 23, 1976

[51] Int. Cl.² .............................................. F16H 1/14
[52] U.S. Cl. ...................................................... 74/417
[58] Field of Search .................................. 74/417, 423

[56] References Cited

U.S. PATENT DOCUMENTS

| | | | |
|---|---|---|---|
| 3,375,727 | 4/1968 | Nasvytis et al. | 74/417 |
| 3,985,238 | 10/1976 | Nakura et al. | 74/417 |

Primary Examiner—Leonard H. Gerin
Attorney, Agent, or Firm—James D. Liles

[57] ABSTRACT

A remotely operable manipulator orients an end-effector mounted to one end of a plurality of serially connected drive shafts. The manipulator has two sets of concentric shafts with individual shafts within each set independently rotatable about an axis common to the set. The common axes of the two sets are obliquely oriented with respect to each other; and a third shaft, rotatable about a third axis, is angularly oriented and connected to the most remote set of shafts. The preferred embodiment has the axes of the two sets and the third shaft intersecting at a single point and permits orientation of the third axis normal to any point upon the spherical surface of a spherical sector generated by the combined movement of the plurality of shafts.

18 Claims, 4 Drawing Figures

MANIPULATOR

BACKGROUND

This invention relates to mechanical manipulators and will be disclosed in connection with an improved remotely operable articulated cantilevered wrist manipulator. Mechanical manipulators are of ancient origin and have been utilized in a wide variety of applications including handling of explosives or other dangerous materials and performing work tasks in unsafe or undesirable working areas, as for example radioactive or underwater environments. More recently, and particularly since the embarkment of computer controlled industrial equipment, manipulators have been increasingly used to perform unsafe and undesirable tasks previously performed by humans with resultant cost savings and increased production efficiency. This increased use may be partially explained by dramatic improvements in control systems within recent years. These improved controls enhance the exploitation of the manipulator's potential as a general purpose machine and give the manipulator the ability and flexibility to perform a wide range of work tasks. Present day controls permit "pre-programmed input" information, usually coded in numerical form, on punched tape or magnetic storage, to instruct the machine through a series of complex movements needed to perform a particular task. The tapes for these control systems can then be easily stored and reinserted into the machine when it becomes necessary to perform the particular task again. The expensive and time-consuming set up time for the controlled machine is then eliminated once the tape is generated; and the machine may be designated as a general purpose machine capable of performing a wide variety of work tasks. The growing interest in general purpose automated manufacturing equipment suggests that the trend for the future is toward even further proliferation of the computer controlled industrialized manipulators or industrial robots.

The prior art robots are generally variations of three different type designs. One of these designs is the link and pivot design. This design employs a series of pivotally supported segments with an end-effector, as for example a grasping device or a welding gun, attached to one end. A second type has extending links in combination with pivots wherein the end points of the links translate along the axes of the links relative to each other. A third type of robot design is that employed by U.S. Pat. Nos. 3,922,930 and 3,739,923 which utilize a plurality of serially connected rotatable drive shafts to provide two or more axes of pivotal motion at a common point capable of being remotely operated. It is this latter type of design to which the present invention is directed.

Implicit in the concept of general purpose automated manufacturing equipment is a requirement of flexability. Indeed, as applied to industrial robots and particularly to those robots which are designed to be controlled by programmable computers, the requirement of flexability is of central importance. It is this characteristic, more than any other, which distinguishes the programmable robot from a dedicated machine capable of performing only a limited predetermined repetitive function. The flexibility offered by a programmable industrial robot is dependent upon both programming for the computers and the orientational and positional capability of the robot arm. More particularly, it is dependent upon the positioning and orientation of the end-effector attached to the end of that robot arm. This flexibility is enhanced by improving either the orientational capabilities of the robot arm or increasing the range of movement of the end-effector.

The instant invention utilizes a wrist section of the robot arm generally of the type disclosed in the above-mentioned patents, but makes important improvements, over these prior art devices which retain virtually all of the previous advantages while increasing both the orientational and positional capabilities. It increases the robot's flexibility and makes it more suitable as a general purpose automated apparatus.

The invention's unique organizational and positional arrangement of drive members permits three serially connected rotary shafts with axes intersecting at a single point to undergo continuous "rolls". The continuous "rolls", rotation about axes parallel to the shaft members, is possible as the arrangement voids the mechanical interference inherent in prior art devices. This advantageous situation is coupled with the capability of orientating the third, or most remote shaft, about a single point, achieved by making all of three shafts intersect at a single point.

The present invention, like most prior art manipulators, generates an imaginery spherical sector as it is rotated through space. It is capable of orientating a part normal to any point on the generated spherical sector. This capability thus eliminates "holes" or "voids" in the spacial orientation of the end-effector and increases the manipulator's flexibility.

SUMMARY OF THE INVENTION

The invention relates to manipulators of the type having a plurality of serially connected drive shafts with a mounting surface affixed to one end. A first shaft rotatable about a first axis coincident with one ordinate of a mutually perpendicular triordinate system is drivingly engaged to transmit rotary motion to a second shaft obliquely orientated with respect to the first shaft. A mounting surface having a centerline angularly orientated with respect to the second shaft is affixed thereto. This mounting surface is rotatable about the axis of the second shaft and has a directional component of movement in each of the directions defined by the mutually perpendicular triordinate system as it is rotated about this second shaft.

DESCRIPTION OF THE PREFERRED EMBODIMENT

Figure 1:
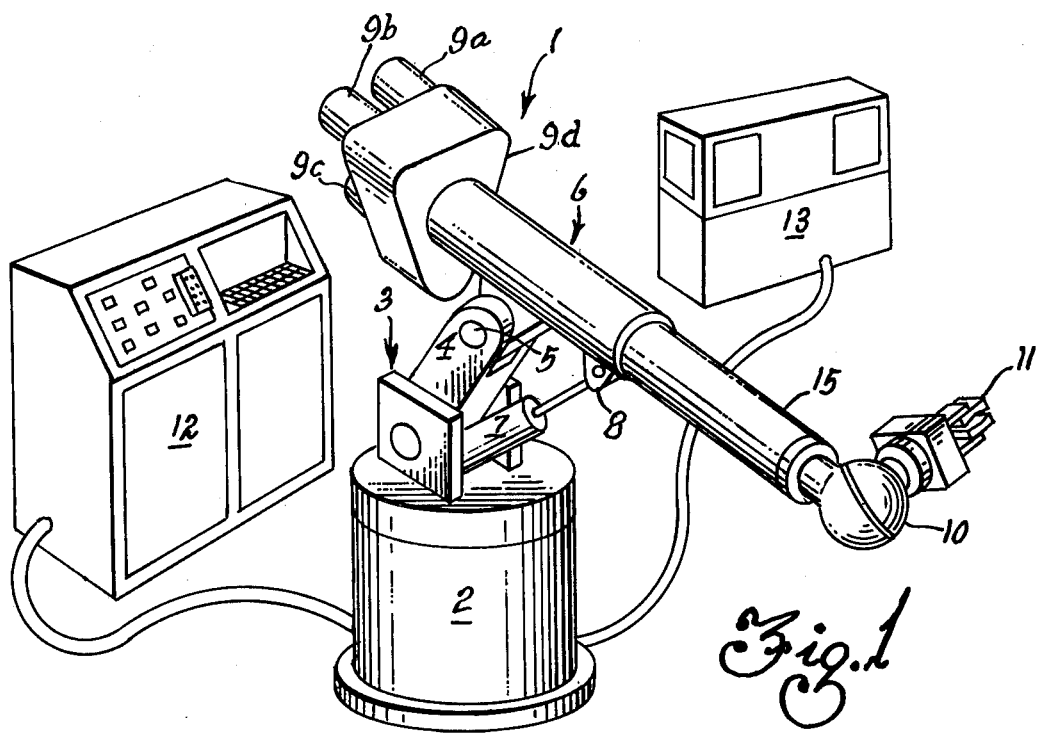
FIG. 1 is a perspective view of a computer controlled industrial robot employing one form of the present invention.

Referring to the drawings and to FIG. 1 in particular, an industrial robot 1 is shown with control apparatus typically accompanying the robot 1 in an environmental setting. The robot 1 has a base 2 secured to the floor. A shoulder 3 is rotatably mounted upon the base 2 and has an upper arm section 4 extending therefrom. A pivoted elbow joint 5 connects the upper arm section 4 with a forearm section 6. Relative movement between the arm sections 4 and 6 is controlled by a hydraulic cylinder 7 extending from the shoulder 3 to a clevis bracket 8 offset from the elbow joint 5. The forearm section 6 is actually a set of three concentric shafts independently rotatable by individual hydraulic motors 9a, 9b and 9c supported in motor housing 9d. A wrist joint 10 adjoins the forearm section 6 on the end opposite the elbow joint 5. The wrist 10, which embodies the subject matter of the present invention supports an end-effector or grasping device 11 upon its most remote end. Associated control apparatus including a computer console 12 and a hydraulic power unit 13 are shown adjacent to the robot 1 and connected in a conventional fashion.

Figure 2:
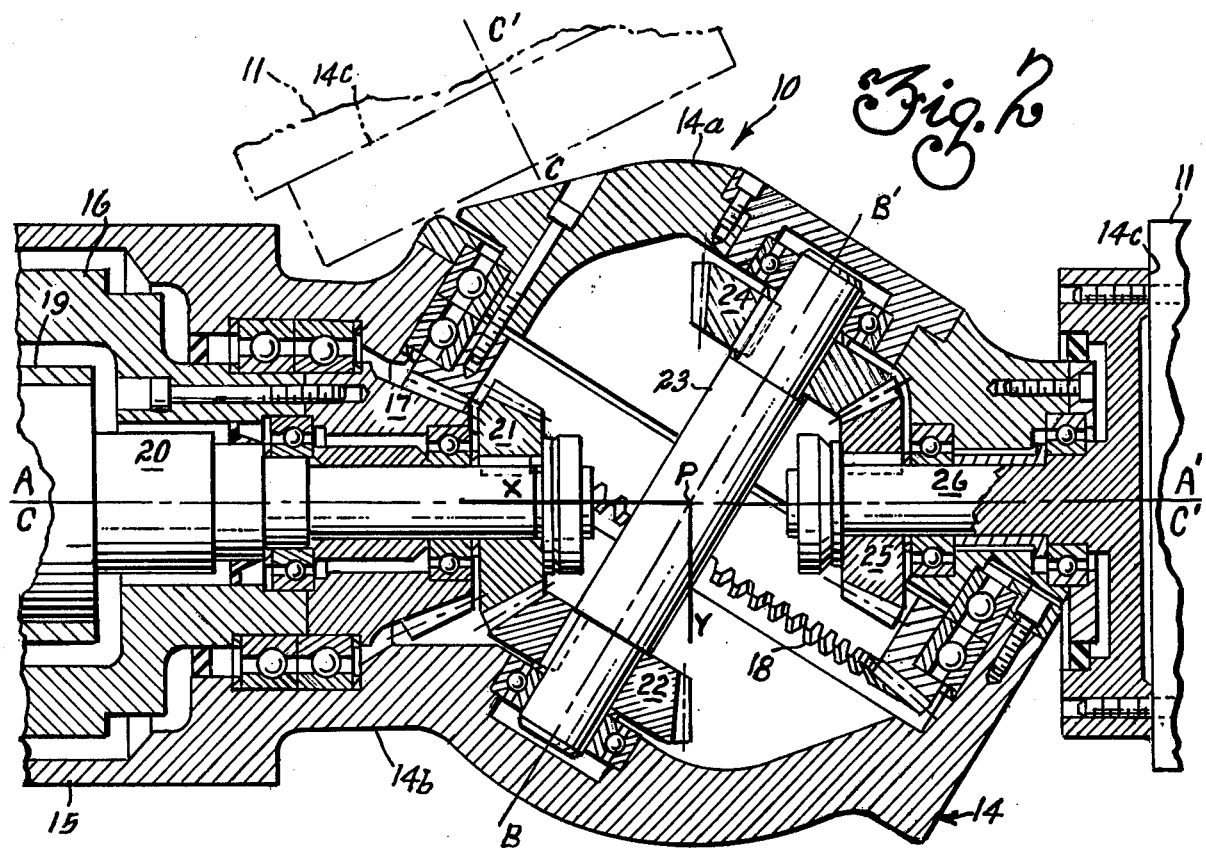
FIG. 2 is an elevational view in cross-section of the wrist section of the robot of FIG. 1.
Figure 3:
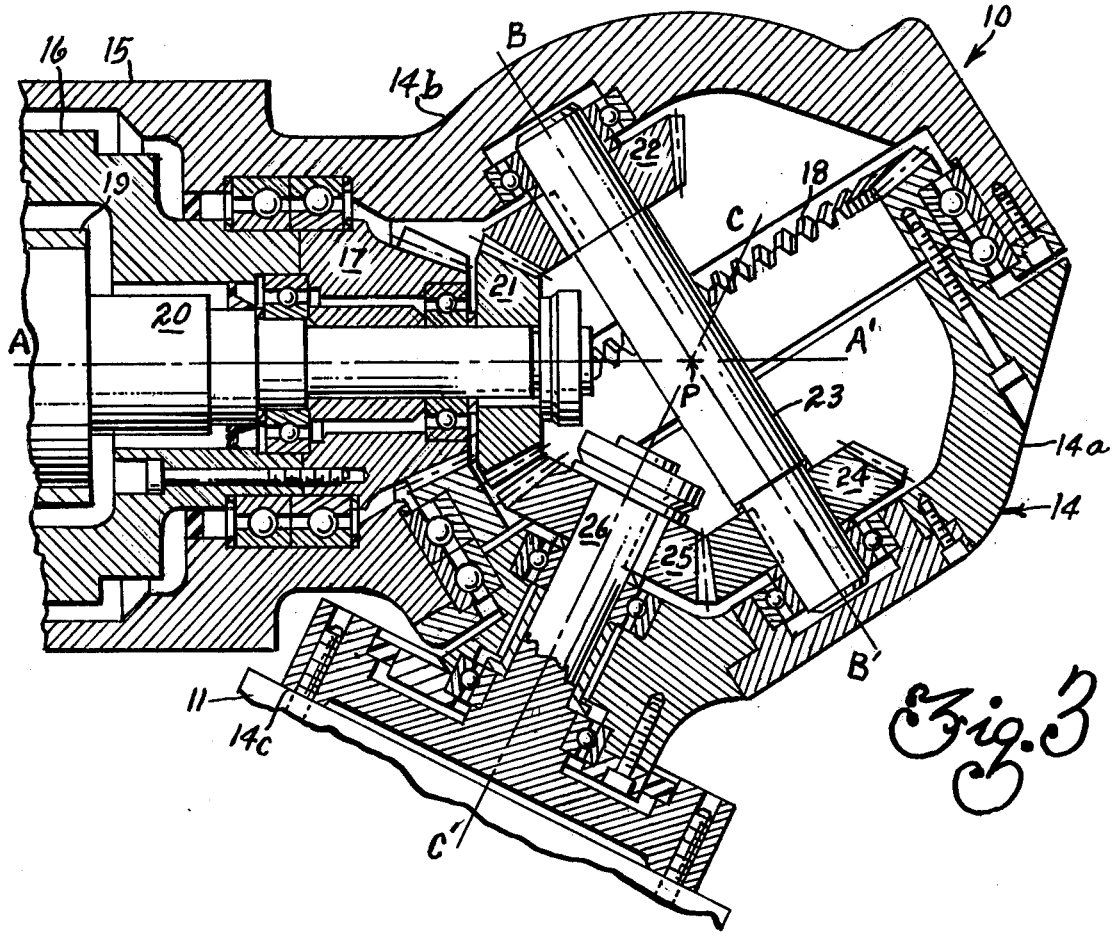
FIG. 3 is another elevational cross-sectional view of the wrist of FIG. 2 with two of the axes rotated from the position shown in FIG. 2.

Referring now to FIGS. 2 and 3, the wrist portion 10 is shown in cross-section and in greater detail. The wrist 10 has a split outer housing 14 having housing portions 14a and 14b mounted upon a forearm section 6 of the robot arm. Housing portions 14a and 14b are both mounted upon an outer forearm shaft 15, the former portion 14a being rotatably mounted with respect to both an outer forearm shaft 15 and its complementary housing portion 14b and rotatable about an axis B-B'. Both housing portions 14a and 14b are attached to the outer forearm shaft 15 and movable therewith as all three members rotate about a second axis A-A', the attachment of shaft 15 and housing portion 14b being rigid.

Rotational movement of the housing portion 14a about axis B-B' is imparted by an intermediate forearm shaft 16 concentrically disposed and contained within outer forearm shaft 15. Like forearm shaft 15, intermediate shaft 16 is rotatable about axis A-A'. This second axis A-A' is obliquely orientated with respect to the first axis B-B', i.e., the axes or their projections intersect at an oblique angle. Rotation of shaft 16 about the axis A-A' drives a bevel gear 17 mounted upon shaft 16 and also rotatable about axis A-A'. Gear teeth on the bevel gear 17 are in mesh with the complementary bevel teeth 18 on the housing portion 14a and drive this rotatable housing portion 14a, translating rotary movement of the shaft 16 about the axis A-A' into rotary movement of housing portion 14a about obliquely oriented axis B-B'. The housing portion 14a has a rotatable planer mounting surface 14c having a centerline C-C' obliquely oriented with respect to the axis B-B'. The end-effector 11 is rotatably affixed upon mounting surface 14c. It is thus seen that housing portion 14a is multi-functional in that it serves as a drive shaft in addition to its housing function.

A third forearm shaft 19, in the set of concentric shafts 15, 16 and 19 rotatable about axis A-A', is disposed within shaft 16 and is rigidly attached to still another drive shaft 20. The drive shaft 20, also rotatable about axis A-A', extends into the housing 14. It should be apparent that the shafts 19 and 20 may be combined into a single shaft. The preferred embodiment of the present description utilizes a solid shaft 20 for extension into the housing 14 and a hollow shaft or tube 19 integrally attached to the shaft 20. Like forearm shaft 16, drive shaft 20 has a bevel gear 21 attached proximate to the extremity extending into the housing 14. This bevel gear 21 is drivingly engaged with a matched bevel gear 22 attached to an internal shaft 23 completely constrained with the housing 14. Both the bevel gear 22 and the shaft 23 are rotatable about axis B-B' and concentric with housing portion or shaft 14a, the two latter mentioned shafts forming a second set of concentric shafts obliquely oriented with respect to the first set of forearm shafts 15, 16 and 19. Opposite ends of the shaft 23 are rotatably supported in housing shaft 14a and housing portion 14b respectively by a suitable bearing system. Proximate to the end of shaft 23, opposite the bevel gear 22, is another bevel gear 24. The gear 24 is rotatable about axis B-B' and drivingly engaged with still another bevel gear 25. The bevel gear 25 is attached to a shaft 26, integral with mounting surface 14c, which is supported by suitable bearings within the housing shaft 14a. The shaft 26, as well as the bevel gear 25 is rotated about, and shown coincident with, centerline C-C' of the mounting surface 14c. Since the housing shaft 14a is itself rotated about axis B-B' and shaft 23 is supported in that housing portion, it follows that the shaft 26 as well as its axis of rotation C-C' rotates about axis B-B' with rotation of the housing shaft 14a. This rotation of the axis C-C' about axis B-B' is readily apparent from a comparison with the phantom position of mounting surface 14c in FIG. 2, obtained by rotating housing shaft 14a through an angle of 180° about axis B-B'. An even broader appreciation of the orientational capabilities of the instant invention might be realized from a comparison of FIGS. 2 and 3. FIG. 3 shows the wrist of FIG. 2 with shafts 15 and 14a both rotated 180°.

As should be apparent from the above description, each individual shaft of the set of concentric forearm shafts 15, 16 and 19 moves the end-effector 11 affixed to mounting surface 14c, about different axes of rotation. Rotation of the forearm drive shaft 15 rotates the entire housing 14 about the axis A-A'. This rotation also imparts rotational movement to shaft 14a about axis B-B' due to the coupling of bevel gears 17 and 18 and the motion of shaft 14a in turn imparts rotation of mounting surface 14c about axis C-C' through bevel gears 24 and 25. The forearm drive shaft 16 translates rotary motion about the axis A-A' into rotary motion about the obliquely oriented axis B-B' through the bevel gear 17 and housing portion 14a. This motion similarly imparts rotational movement of mounting surface 14c about axis C-C' due to the coupling of bevel gears 24 and 25. Rotation of forearm shaft 19 converts rotary motion of drive shafts 19 and 20 into rotary motion of obliquely oriented shaft 23, which in turn converts this imparted motion into rotary motion of shaft 26 about axis C-C'. Additionally, and again as should be apparent from a comparison of FIGS. 2 and 3, drive shaft 15 rotates axis B-B' about axis A-A' and rotation of inner forearm shaft 16 rotates shaft 26 about axis B-B'. Rotation of one or more of the individual shafts 15 or 16 of the set of concentric forearm shafts provides for planetary motion of the end-effector 11.

The illustration of FIG. 2 shows the axis C-C' coincident with the axis A-A'. As readily apparent from FIG. 3, this condition is unique to the position of FIG. 2. In all positions of the illustrated embodiment, however, the axes A-A', B-B' and C-C' intersect at a single point, P. This means, inter alia, that the axis C-C' and shaft 26 as well as the attached end-effector 11 may be oriented normal to the spherical surface at any point on the spherical sector generated by the combined movement of the aforementioned shafts. In the illustrated embodiments, the angle, A'PB', between axis A-A' and B-B' as well as the angle, B'PC', between axes B-B' and C-C' is fixed at an angle greater than 45°. Consequently, the spherical sector generated by the movement of the end-effector is greater than a hemisphere and the axis C–C' may be oriented normal to the spherical surface at any point on the sector. It should be apparent that the orientation of the axis C–C' about a single point P is vital for the normal orientation of the axis C–C' to any location on the generated spherical sector without any "holes", i.e. locations in which normal orientation of the axis C–C' is not possible. The oblique orientation of axis B–B' with respect to the axis A–A' facilitates the mechanical implementation and construction of these mutually intersecting axes. Deviations from the single point of axes coincidence may be made very small with correspondingly small "holes" in the spherical surface generated by positioning the end-effector 11 in all of its potential locations. Again, a small deviation of the single point of axes intersection is facilitated in its mechanical implementation by the oblique orientation of the axes. It should also be apparent that small deviations from this point of coincidence are possible and may even be preferable for some applications. These deviations, however, inherently fail to provide the full range of orientation capabilities made possible by arranging the three axes to intersect at a single point.

The oblique orientation of the three axes, A–A', B–B' and C–C' permit the end-effector 11, attached to the mounting surface 14c of drive shaft 26, to move with directional components in each direction defined by a mutually perpendicular triordinate system which has the axis P–A' as one ordinant. In other words, with regards to a reference system (X, Y, Z) having one ordinate X, coincident with axis P–A', a perpendicular ordinate Y, (which like X is in the plane of the illustration sheet) and a mutually perpendicular ordinate Z, (normal to the sheet of the illustration), the rotation of the end-effector about axis B–B' provides for components of motion in each of the directions (X, Y and Z) defined by the mutually perpendicular triordinate system. In a similar manner, when axis C–C' has been rotated about axis B–B' and is not coincident with axis A–A', the equal rotation of the concentric shafts 15 and 16 about axis A–A' provides for components of motion at the end-effector 11 in the Y and Z directions defined by the triordinate system.

Figure 4:
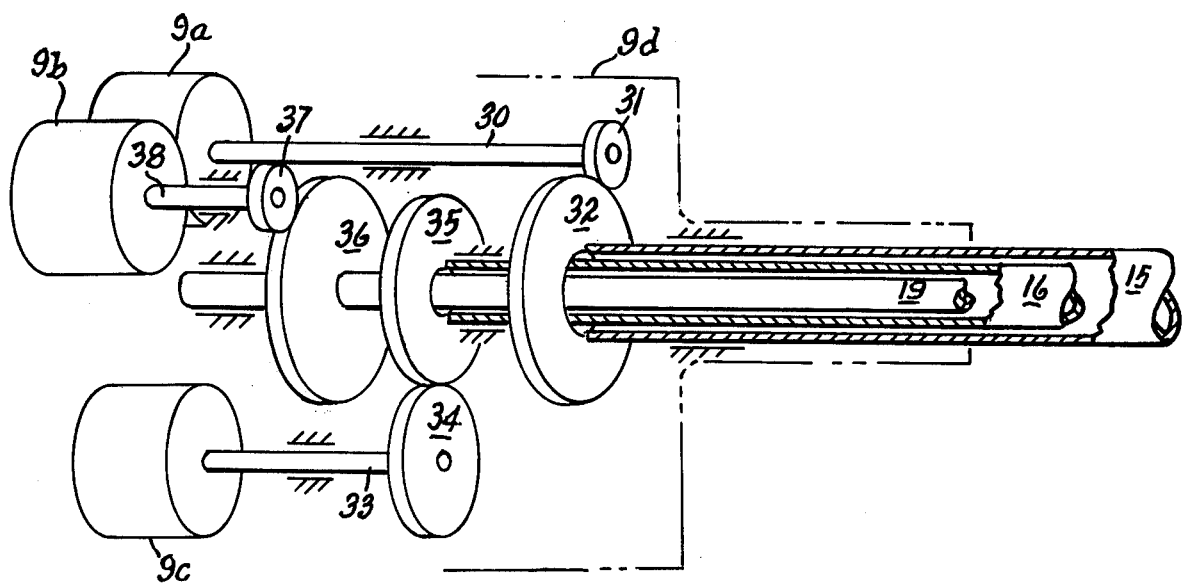
FIG. 4 is a diagrammatic illustration of the hydraulic motors and forearm section of FIG. 1 depicting the drive mechanism employed by the wrist of the preferred embodiment.

Each of the three concentric forearm 15, 16 and 19 shafts is rotated by a separate hydraulic motor 9a, 9b and 9c mounted upon the robot elbow 5 as shown in FIG. 1. The diagrammatic illustration of FIG. 4 depicts the drive mechanism employed to rotate the drive shafts 15, 16 and 19 about the axis A–A'. Hydraulic motor 9a has a shaft 30 extending into motor housing 9d. The shaft 30 drives a spur gear 31 which is in mesh with a spur gear 32 fixed to forearm shaft 15, the hydraulic motor 9c has a shaft 33 and a spur gear 34 which is drivingly engaged with a meshed spur gear 35. The spur gear 35 is axially spaced from gear 32 and affixed to forearm shaft 16 which extends through the gear 32 and beyond the terminus of forearm shaft 15. The intermost forearm shaft 19 is driven in a similar manner by a spur gear 26 driven by spur gear 37 from shaft 38 extending from hydraulic motor 9b. The gear 36 is axially spaced from the gear 35 and affixed to forearm shaft 19 beyond the terminus of forearm shaft 16.

It should be apparent to those skilled in the art from the above description that the instant invention transmits power through a selectively variable angled joint and that the invention or subsets thereof has potential utility in a variety of applications requiring such capability.

Although the present invention has been described in conjunction with the preferred embodiments it is to be understood that modifications and variations may be resorted to without departing from the spirit of the invention as those skilled in the art will readily understand. Such modifications and variations are considered to be within the view and scope of the present invention as defined by the appended claims.

What is claimed is:

1. An improved manipulator of the type having a plurality of serially connected drive shafts and a mounting surface affixed to one end thereof, wherein the improvement comprises:
    a. a first shaft rotatable about a first axis coincident with one ordinant of a mutually perpendicular triordinant system;
    b. a second shaft rotatably mounted to said first shaft, said second shaft being rotatable about a second axis obliquely oriented with respect to said first axis and rotatable thereabout;
    c. means for imparting rotational movement to said second shaft about the second axis in accordance to rotational movement of a shaft rotatable about said first axis; and
    d. a mounting surface having a centerline angularly oriented with respect to said second shaft and affixed thereto, said mounting surface being rotatable about said second axis wherein the movement of said mounting surface has a directional component of movement in each of the directions defined by said mutually perpendicular triordinate system as the mounting surface is rotated about said second axis.

2. A manipulator as recited in claim 1, further comprising a third shaft upon which said mounting surface is attached, said third shaft being rotatable about a third axis angularly oriented with respect to said second axis.

3. A manipulator as recited in claim 2, wherein said third axis is obliquely oriented with respect to said second axis.

4. A manipulator as recited in claim 3, wherein the angle between the first axis and the second axis is fixed.

5. A manipulator as recited in claim 4, wherein the angle between said second axis and said third axis is fixed.

6. An improved manipulator of the type having a plurality of serially connected drive shafts and a mounting surface affixed to one end thereof, wherein the improvement comprises:
    a. a first shaft rotatable about a first axis;
    b. a second shaft rotatably mounted upon said first shaft, said second shaft being rotatable about a second axis angularly intersecting said first axis and rotatable thereabout;
    c. means for imparting rotational movement to said second shaft about said second axis in accordance to rotational movement of a shaft about said first axis; and
    d. a third shaft rotabably mounted to said second shaft and rotatable about a third axis obliquely oriented with respect to said second axis and rotatable thereabout, said third shaft having the mounting surface affixed thereto and said third axis intersecting said first axis and said second axis at a single point.

7. A manipulator as recited in claim 6, wherein the angle between the first axis and the second axis is oblique.

8. A manipulator as recited in claim 7, wherein the angle between said first axis and said second axis is fixed.

9. A manipulator as recited in claim 8, wherein the angle between said second axis and said third axis is fixed.

10. An improved manipulator of the type having a plurality of serially connected drive shafts and a mounting surface affixed to one end thereof, wherein the improvement comprises:
   a. a first set of concentric drive shafts independently rotatable about a first axis coincident with one ordinate of a mutually perpendicular triordinate system;
   b. a second set of concentric drive shafts independently rotatable about a second axis obliquely oriented with respect to said first axis and rotatable thereabout;
   c. means for selectively imparting independent rotational movement about said second axis to each concentric shaft in said second set in accordance to rotational movement of one of said shafts in said first set;
   d. a third shaft rotatable about a third axis angularly oriented to said second axis, said third shaft being further rotatable about said second axis and having a mounting surface affixed thereto whereby the movement of said mounting surface has a directional component of movement in each of the directions defined by said mutually perpendicular triordinate system as said mounting surface is rotated about said second axis.

11. A manipulator as recited in claim 10, wherein the angle between said second axis and said third axis is oblique.

12. A manipulator as recited in claim 11, wherein the angle between said first axis and said second axis is fixed.

13. A manipulator as recited in claim 12, wherein the angle between said second axis and said third axis is fixed.

14. An improved manipulator of the type having a plurality of serially connected drive shafts and a mounting surface affixed to one end thereof, wherein the improvement comprises:
   a. a first set of concentric drive shafts independently rotatable about a first axis;
   b. a second set of concentric drive shafts independently rotatable about a second axis angularly oriented with respect to first axis and rotatable thereabout;
   c. means for selectively imparting independent rotational movement about said second axis to each concentric shaft in said second set in accordance to rotation of one of said shafts in said first set; and
   d. a third shaft mounted to said second set and rotatable about a third axis angularly oriented with respect to said second axis and rotatable thereabout, said third shaft having the mounting surface mounted thereto and said third axis intersecting said first axis and said second axis at a single point.

15. A manipulator as recited in claim 14, wherein said third axis is obliquely oriented with respect to said second axis.

16. A manipulator as recited in claim 15, wherein the angle between said first and second axes is fixed.

17. A manipulator as recited in claim 16 wherein the angle between said second and said third axes is fixed.

18. An improved remotely operable articulated manipulator of the type having a plurality of serially connected drive shafts and an end-effector mounted to one end thereof, wherein the improvement comprises:
   a. a first set of concentric drive shafts independently rotatable about a first axis coincident with one ordinant of a mutually perpendicular triordinate system;
   b. a second set of concentric drive shafts independently rotatable about a second axis obliquely oriented with respect to said first axis and rotatable thereabout;
   c. a first set of gears, including at least two bevel gears, attached to at least two shafts in said first set of shafts;
   d. a second set of gears, including at least two bevel gears, attached to at least two shafts in said second set of shafts, said second set of gears being drivingly connected to said first set of gears; and
   e. a third shaft mounted to said second set of shafts and rotatable about a third axis obliquely fixed to said second axis and rotatable thereabout, said third shaft having the end-effector mounted thereto whereby the movement of said end-effector has a directional component of movement in each of the directions defined by said mutually perpendicular triordinate system as said end-effector is rotated about said second axis, and said third axis intersects said first axis and said second axis at a single point.

* * * * *

UNITED STATES PATENT OFFICE
CERTIFICATE OF CORRECTION

PATENT NO. : 4,068,536
DATED : January 17, 1978
INVENTOR(S) : Theodore Hahn Stackhouse It is certified that error appears in the above—identified patent and that said Letters Patent are hereby corrected as shown below:

Claim 1, line 19, the word "wherein" should read --whereby--.

Signed and Sealed this

Ninth Day of May 1978

[SEAL]

Attest:

RUTH C. MASON
Attesting Officer

LUTRELLE F. PARKER
Acting Commissioner of Patents and Trademarks